United States Patent
Coats

(10) Patent No.: US 12,188,766 B2
(45) Date of Patent: Jan. 7, 2025

(54) GUIDE SYSTEM FOR ASSISTANCE IN MOUNTING A SONAR TRANSDUCER ASSEMBLY OR HOUSING

(71) Applicant: Navico, Inc., Tulsa, OK (US)

(72) Inventor: Eric L. Coats, Forest Grove, OR (US)

(73) Assignee: Navico, Inc., Tulsa, OK (US)

( * ) Notice: Subject to any disclaimer, the term of this patent is extended or adjusted under 35 U.S.C. 154(b) by 456 days.

(21) Appl. No.: 17/715,290

(22) Filed: Apr. 7, 2022

(65) Prior Publication Data

US 2023/0324163 A1    Oct. 12, 2023

(51) Int. Cl.
*G01B 5/25* (2006.01)
*B63B 79/10* (2020.01)
*G01S 7/521* (2006.01)
*G01S 15/89* (2006.01)

(52) U.S. Cl.
CPC ............... *G01B 5/25* (2013.01); *B63B 79/10* (2020.01); *G01S 7/521* (2013.01); *G01S 15/89* (2013.01)

(58) Field of Classification Search
CPC .................................. G01B 5/25; G01S 15/88
USPC ................ 33/1 N, 286, 494, 613, 645, 679.1
See application file for complete search history.

(56) References Cited

U.S. PATENT DOCUMENTS

| | | | | |
|---|---|---|---|---|
| 4,754,947 A * | 7/1988 | Propp | ...................... | F21V 21/02 248/57 |
| 4,974,213 A * | 11/1990 | Siwecki | .................. | G01S 3/802 367/153 |
| 5,505,002 A * | 4/1996 | Falco | ..................... | A41D 25/08 2/144 |
| 5,664,334 A * | 9/1997 | Watts | ...................... | B43L 7/005 235/69 |
| 6,011,628 A * | 1/2000 | Tullis | .................... | G01B 11/272 356/399 |
| 6,536,124 B1* | 3/2003 | Eskew | ..................... | G01B 3/56 33/538 |

(Continued)

OTHER PUBLICATIONS

"Side Imaging Transducer Mounting Template (XHS 9 HDSI 180 T);" *Appendix a—Humminbird 998c SI User Manual;* p. 159; Manuals Directory; retrieved Apr. 6, 2022 from https://www.manualsdir.com/manuals/91520/humminbird-998c-si-958c-858c-898c-si.html?page=159.

(Continued)

*Primary Examiner* — George B Bennett
(74) *Attorney, Agent, or Firm* — Nelson Mullins Riley & Scarborough LLP

(57) ABSTRACT

A guide system is provided for use in mounting of a sonar transducer assembly or housing. The guide system includes a gauge having horizontal lines marked thereon. The horizontal lines indicate appropriate tab positions corresponding to hull angles of a watercraft. The guide system also includes a reference tab configured to be positioned on the gauge at an appropriate tab position corresponding to an estimated hull angle to indicate a correct sonar transducer assembly or housing position. Sloped lines may be marked on the gauge, and the sloped lines may extend at different slopes and may be configured to provide the estimated hull angle of the watercraft when the user aligns one of the sloped lines with a bottom edge of the hull of the watercraft at a position corresponding to the position where the sonar transducer assembly or housing will be mounted to the hull.

20 Claims, 14 Drawing Sheets

(56) References Cited

U.S. PATENT DOCUMENTS

| | | | | |
|---|---|---|---|---|
| 6,725,559 B2* | 4/2004 | Burt, Jr. | ............... | A41H 3/002 |
| | | | | 33/644 |
| 6,757,984 B2* | 7/2004 | Harris | ............... | B23Q 9/0014 |
| | | | | 33/640 |
| 6,973,737 B2* | 12/2005 | Terrazas | ............... | G06G 1/0005 |
| | | | | 33/1 BB |
| 7,076,879 B2* | 7/2006 | Murphy | ............... | G01S 17/08 |
| | | | | 33/227 |
| 7,652,952 B2* | 1/2010 | Betts | ............... | G01S 15/107 |
| | | | | 367/92 |
| 9,212,886 B2* | 12/2015 | Butirro | ............... | A63B 69/36 |
| 11,247,757 B2* | 2/2022 | Zheng | ............... | B63G 8/001 |
| 11,270,458 B2* | 3/2022 | Nishiyama | ............... | H04N 23/63 |
| 11,367,425 B2* | 6/2022 | Antao | ............... | G10K 11/006 |
| 11,486,989 B2* | 11/2022 | Johnson | ............... | G01C 23/00 |
| 2020/0090367 A1* | 3/2020 | Nishiyama | ............... | H04N 23/63 |
| 2020/0150677 A1* | 5/2020 | Walters | ............... | G05D 1/0206 |
| 2021/0094665 A1* | 4/2021 | Schmid | ............... | B63B 49/00 |
| 2021/0132204 A1* | 5/2021 | Caspall | ............... | G01S 15/8902 |
| 2021/0166568 A1* | 6/2021 | Kersulec | ............... | B63B 43/18 |
| 2021/0206460 A1* | 7/2021 | Hawker | ............... | B63B 79/10 |
| 2022/0350005 A1* | 11/2022 | Derrow, II | ............... | G01S 7/529 |
| 2024/0092464 A1* | 3/2024 | Crawford | ............... | B63C 9/0011 |
| 2024/0271943 A1* | 8/2024 | Johnson | ............... | G01C 21/20 |

OTHER PUBLICATIONS

Hendricks, Jim; "Installing a Transom-Mount Transducer on a Boat;" Apr. 6, 2020; retrieved Apr. 6, 2022 from https://www.boatingmag.com/story/how-to/installing-a-transom-mount-transducer-on-a-boat/.

* cited by examiner

GUIDE SYSTEM FOR ASSISTANCE IN MOUNTING A SONAR TRANSDUCER ASSEMBLY OR HOUSING

FIELD OF THE INVENTION

Embodiments of the present invention relate generally to a guide system that may be used to assist in mounting a sonar transducer assembly or housing at a correct position based on an estimated hull angle of a watercraft.

BACKGROUND OF THE INVENTION

Sonar transducer assemblies are often used on a watercraft to obtain information about the underwater environment near the watercraft. These sonar transducer assemblies are typically attached via a bracket to the hull or transom of a watercraft. However, installation of the sonar transducer assembly or housing directly to the hull or the transom often results in a high amount of aeration or air bubbles that negatively interfere with the performance of the sonar transducer assembly. For example, this aeration may result in a reduced picture quality for sonar images generated using sonar data from the sonar transducer assembly. Also, it can be difficult to properly align the transducer housing so that it points directly downwardly (and is not skewed).

BRIEF SUMMARY OF THE INVENTION

The amount of aeration occurring for a watercraft may vary based on the hull angle, so it is beneficial to install a sonar transducer assembly or housing at a specific height based on the hull angle at the location where the sonar transducer assembly or housing is installed. By installing the sonar transducer assembly or housing at an appropriate height, the sonar transducer assembly or housing may be positioned at a location where the effects of aeration may be reduced.

Various embodiments discussed herein provide a guide system that allows users to easily determine a correct sonar transducer assembly or housing position based on an estimated hull angle of a watercraft. This correct sonar transducer assembly or housing position may be a certain distance below a connection point with the hull or transom of the watercraft (with the transom being a portion of the hull), and installation at this sonar transducer position may eliminate or reduce the negative effects of aeration.

A gauge may be provided with sloped lines marked thereon, and the sloped lines may be used to provide an estimated hull angle of the watercraft. A user may obtain an estimated hull angle by aligning one of the sloped lines with a bottom edge of the hull of the watercraft at a position corresponding to the position where the sonar transducer assembly or housing will be mounted to the hull. The same gauge or another gauge may possess horizontal lines marked thereon, with the horizontal lines providing appropriate tab positions that correspond to various hull angles. A reference tab may be provided, and the user may assemble the reference tab to the gauge and position the reference tab at an appropriate tab position on the gauge that corresponds to the estimated hull angle of the watercraft. The assembled guide system may be placed adjacent to the hull or transom of the watercraft at the location where a sonar transducer assembly or housing is being installed, and the reference tab may indicate the correct position for a sonar transducer assembly or housing.

The guide system and methods for using the guide system provide several potential advantages. The guide system is easy for users to make and use, permitting an estimated hull angle to be quickly identified and permitting the estimated hull angle to be used to install the reference tab at an appropriate tab position. The guide system may include a small number of parts, reducing the cost of manufacturing and increasing the ease of assembly. Furthermore, in some embodiments, sloped lines and horizontal lines may be provided on the same gauge or even on the same side of a gauge, and this may permit the user to quickly and easily use the guide system and may also minimize the number of required components. A member may be provided in some embodiments in the form of a cylindrical rod, and this member may be assembled to the gauge to allow the gauge to be easily self-leveled. This self-leveling may ensure that the estimated hull angle is accurate and/or that the appropriate tab position is correct. Additionally or alternatively, this self-leveling may ensure that the sonar transducer assembly or housing will be mounted parallel to the surface of the water or the ground. Furthermore, some embodiments may permit the guide system to remain assembled at all times, avoiding the need for any repeated assembly and disassembly and increasing the ease of use for end users.

In an example embodiment, a guide system is provided for use in mounting of a sonar transducer assembly or housing. The guide system includes a gauge having a plurality of horizontal lines marked on the gauge. The plurality of horizontal lines indicate appropriate tab positions corresponding to hull angles of a watercraft. The guide system also includes a reference tab, and the reference tab is configured to be positioned on the gauge at an appropriate tab position corresponding to an estimated hull angle to indicate a correct sonar transducer assembly or housing position, and the reference tab extends from the gauge to indicate a correct sonar transducer assembly or housing position during mounting of the sonar transducer assembly or housing.

In some embodiments, a plurality of sloped lines may be marked on the gauge, and the plurality of sloped lines may extend at different slopes and may be configured to provide the estimated hull angle of the watercraft when the user aligns one of the plurality of sloped lines with a bottom edge of the hull of the watercraft at the anticipated mounting position corresponding to the position where the sonar transducer assembly or housing will be mounted to the hull.

In some embodiments, the plurality of horizontal lines may be marked on a first side of the gauge and the plurality of sloped lines may be marked on a second side of the gauge. In some embodiments, the plurality of horizontal lines may be marked on a first side of the gauge and the plurality of sloped lines may also be marked on the first side of the gauge.

In some embodiments, the guide system may also include a member that is configured to be assembled to the gauge. The member may be configured to be positioned adjacent to the bottom edge of the hull of the watercraft at the anticipated mounting position so as to provide a reference location for the sonar transducer assembly or housing. In some related embodiments, the member may be configured to be positioned adjacent to the transom of the watercraft at the anticipated mounting position. Additionally, in some embodiments, the member may be a cylindrical rod, and the member may be configured to self-level. Furthermore, in some embodiments, the guide system may also include a fastener that is configured to restrain the movement of the member relative to the watercraft.

In some embodiments, the gauge may have a top end and a bottom end. Further, the gauge may define a first recess proximate to the top end, and the first recess may be configured to receive a member that is configured to be positioned adjacent to the bottom edge of the hull of the watercraft at the anticipated mounting position to provide a reference location for the sonar transducer assembly or housing.

In some embodiments, a plurality of sloped lines may be marked on a second gauge. The plurality of sloped lines may extend at different slopes and may be configured to provide the estimated hull angle of the watercraft when the user aligns one of the plurality of sloped lines with a bottom edge of the hull of the watercraft below at the anticipated mounting position.

In some embodiments, the gauge may have a top end and a bottom end. Further, the gauge may define a second recess proximate to the bottom end, and the second recess may be configured to receive a portion of the reference tab. The second recess may be a narrow slit, and the second recess may be configured to permit the reference tab to slide up and down to position the reference tab at the appropriate tab position. In some related embodiments, the reference tab may include a main portion, an insert portion, and a connecting portion that connects the main portion and the insert portion. Further, the insert portion may be configured to be received in the second recess of the gauge so that the insert portion is positioned at the second side of the gauge with its movement being restrained and so that the main portion is positioned at the first side of the gauge.

In some embodiments, the gauge may have a top end and a bottom end. Further, the gauge may define a first recess proximate to the top end, and the gauge may define a second recess proximate to the bottom end. The plurality of sloped lines may be provided between the first recess and the second recess.

In some embodiments, the gauge may have a top end and a bottom end. Further, the gauge may define a second recess proximate to the bottom end, and the plurality of horizontal lines may be marked proximate to the second recess.

In some embodiments, the correct sonar transducer assembly or housing position may be the position where the bottom of the sonar transducer assembly or housing should be located.

In another example embodiment, a gauge is provided for use in mounting of a sonar transducer assembly or housing. The gauge includes a first side with a plurality of horizontal lines marked on the first side. The plurality of horizontal lines indicate appropriate mounting positions for a sonar transducer assembly or housing corresponding to hull angles of the watercraft. The gauge also includes a plurality of sloped lines marked on the first side of the gauge or on a second side of the gauge. The plurality of sloped lines extend at different slopes and are configured to provide an estimated hull angle of the watercraft when the user aligns one of the plurality of sloped lines with a bottom edge of the hull of the watercraft at an anticipated mounting position, with the anticipated mounting position being a position corresponding to the position where the sonar transducer assembly or housing will be mounted to the hull. In some embodiments, the correct sonar transducer assembly or housing position provides a correct orientation, a correct horizontal position, and a correct vertical position for the sonar transducer assembly or housing. In some embodiments, the gauge may be configured to receive a reference tab at an appropriate mounting position on the gauge corresponding to the estimated hull angle to indicate the correct sonar transducer assembly or housing position.

In another example embodiment, a method for using a guide system is provided. The method includes providing a gauge that has a plurality of sloped lines marked on the gauge. The plurality of sloped lines extend at different slopes, and the plurality of sloped lines are configured to indicate an estimated hull angle of a watercraft. The gauge also includes a plurality of horizontal lines marked on the gauge, and the plurality of horizontal lines indicate appropriate tab positions corresponding to hull angles of the watercraft. The method also includes providing a reference tab that is configured to be positioned on the gauge at the appropriate tab position corresponding to the estimated hull angle to indicate a correct sonar transducer assembly or housing position. The method also includes using the plurality of sloped lines to determine the estimated hull angle of the watercraft by aligning one of the plurality of sloped lines with a bottom edge of the hull of the watercraft at an anticipated mounting position, which may be a position corresponding to the position where the sonar transducer assembly or housing will be mounted to the hull; assembling the reference tab to the gauge so that the reference tab is positioned at an appropriate tab position corresponding to the estimated hull angle; and positioning the reference tab and the gauge proximate to the hull of the watercraft.

In some embodiments, the method may also include providing a member; assembling the member to a top end of the gauge; and positioning the member adjacent to the hull of the watercraft at the anticipated mounting position to provide a reference location for the sonar transducer assembly or housing.

BRIEF DESCRIPTION OF THE DRAWINGS

Figure 1A:
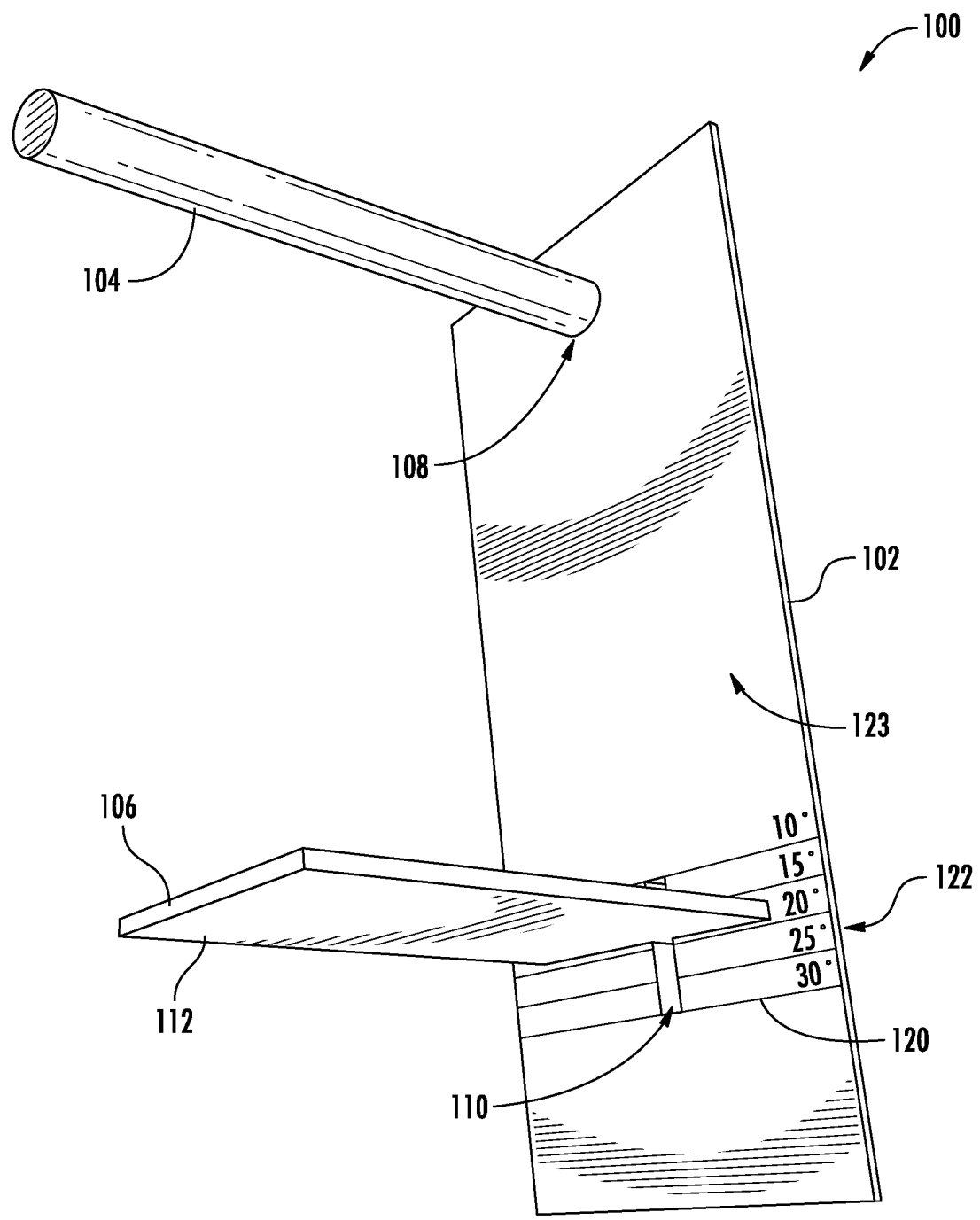
Figure 1B:
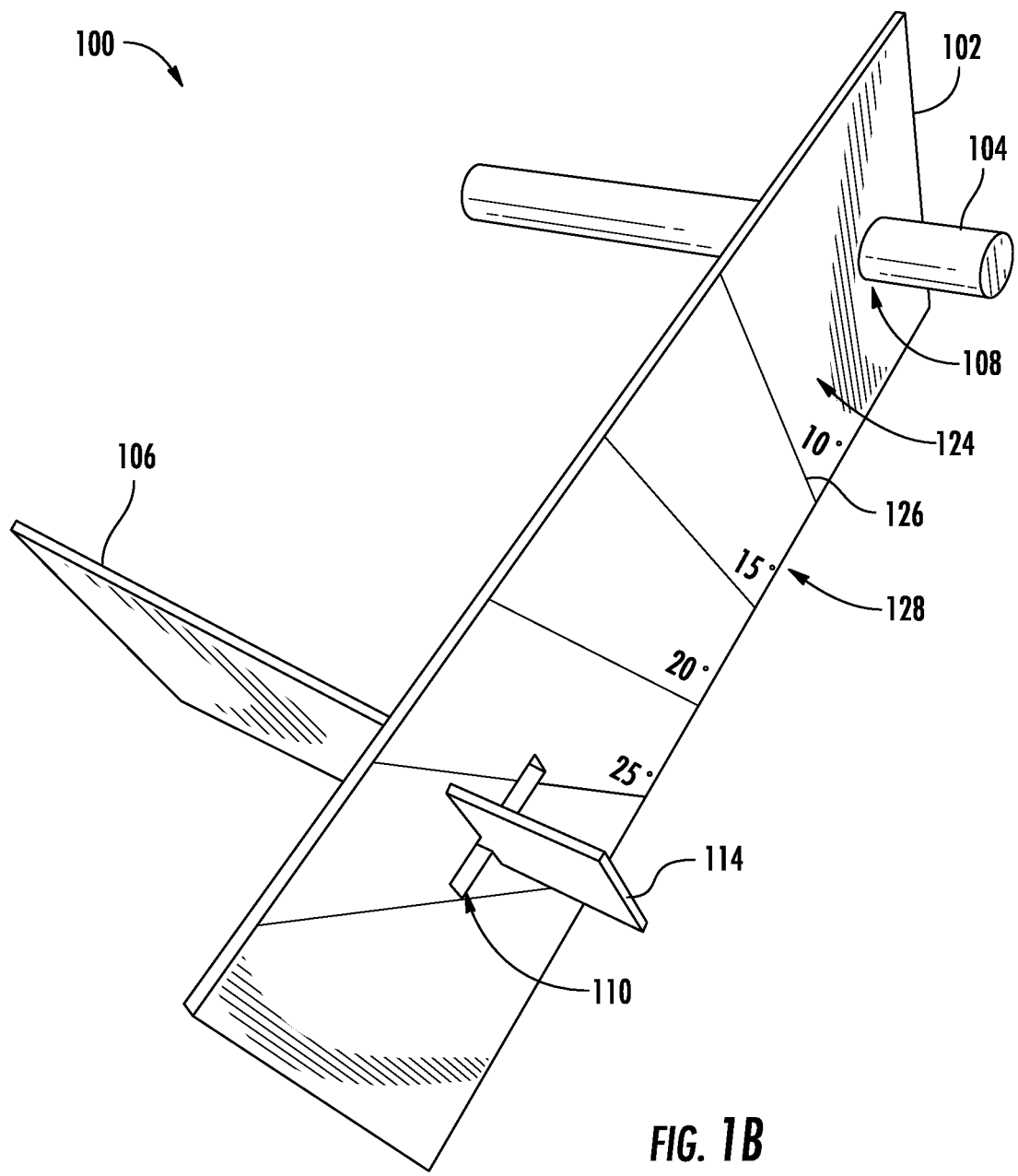
Figure 1C:
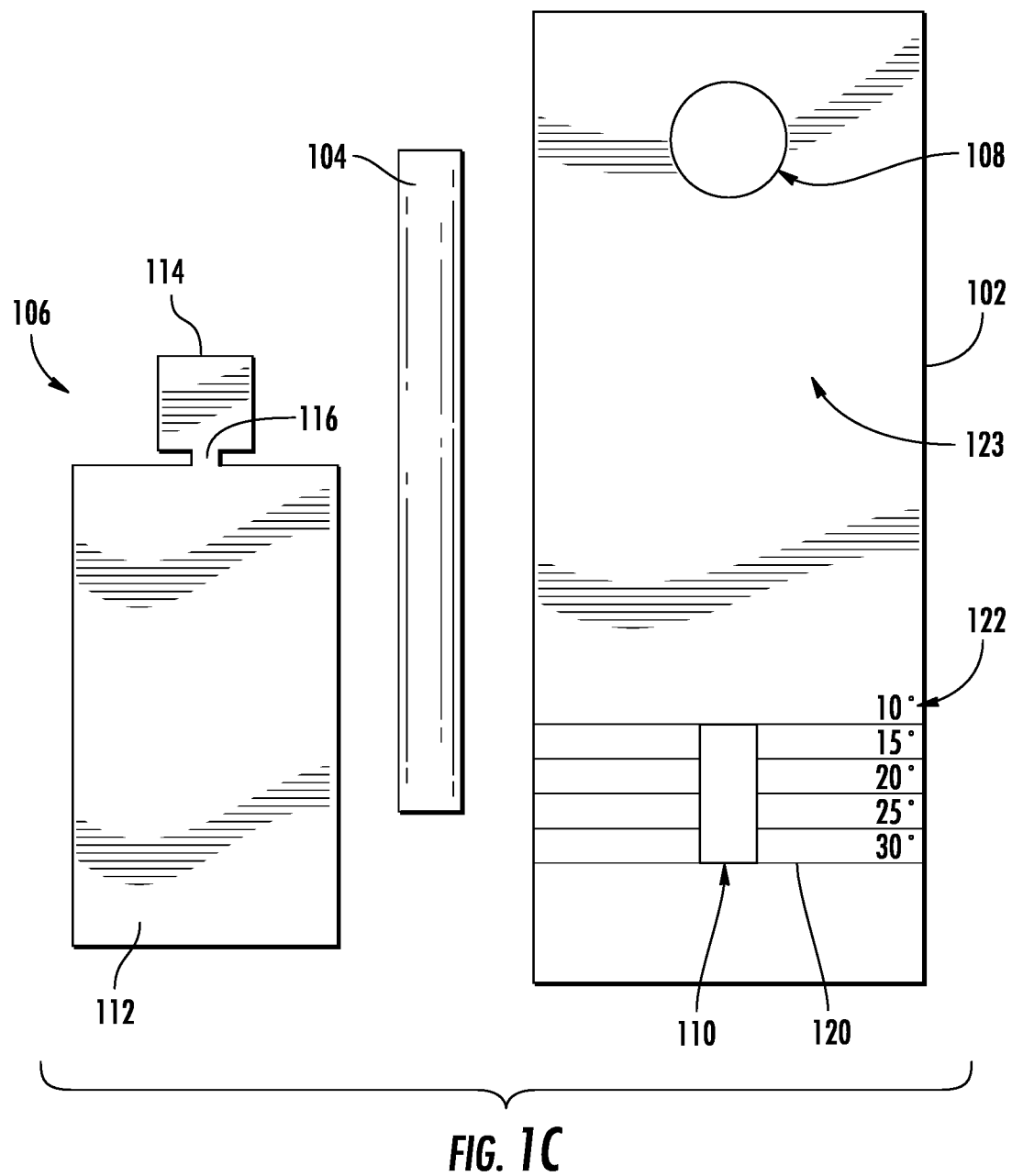
Figure 2A:
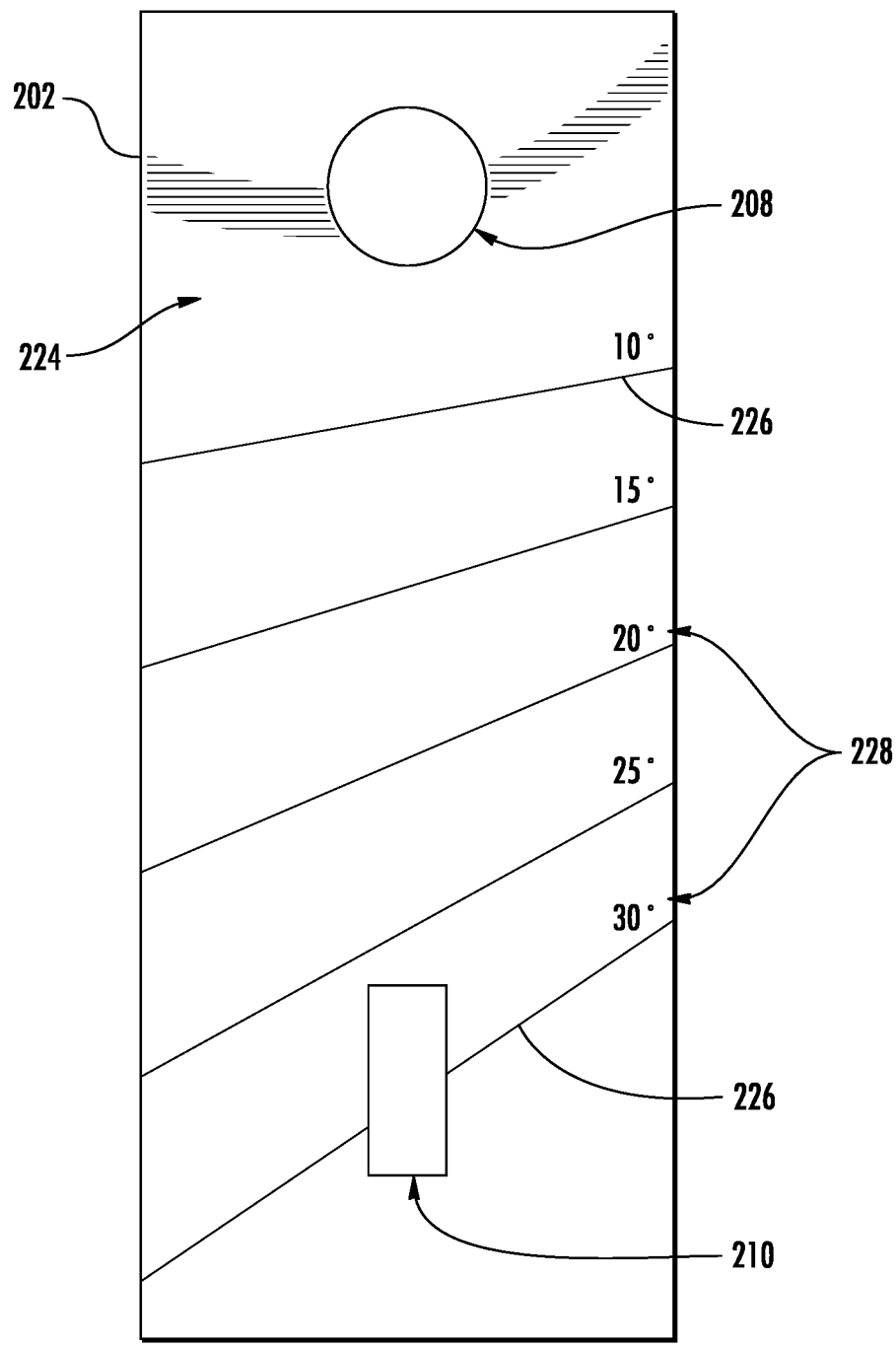
Figure 2B:
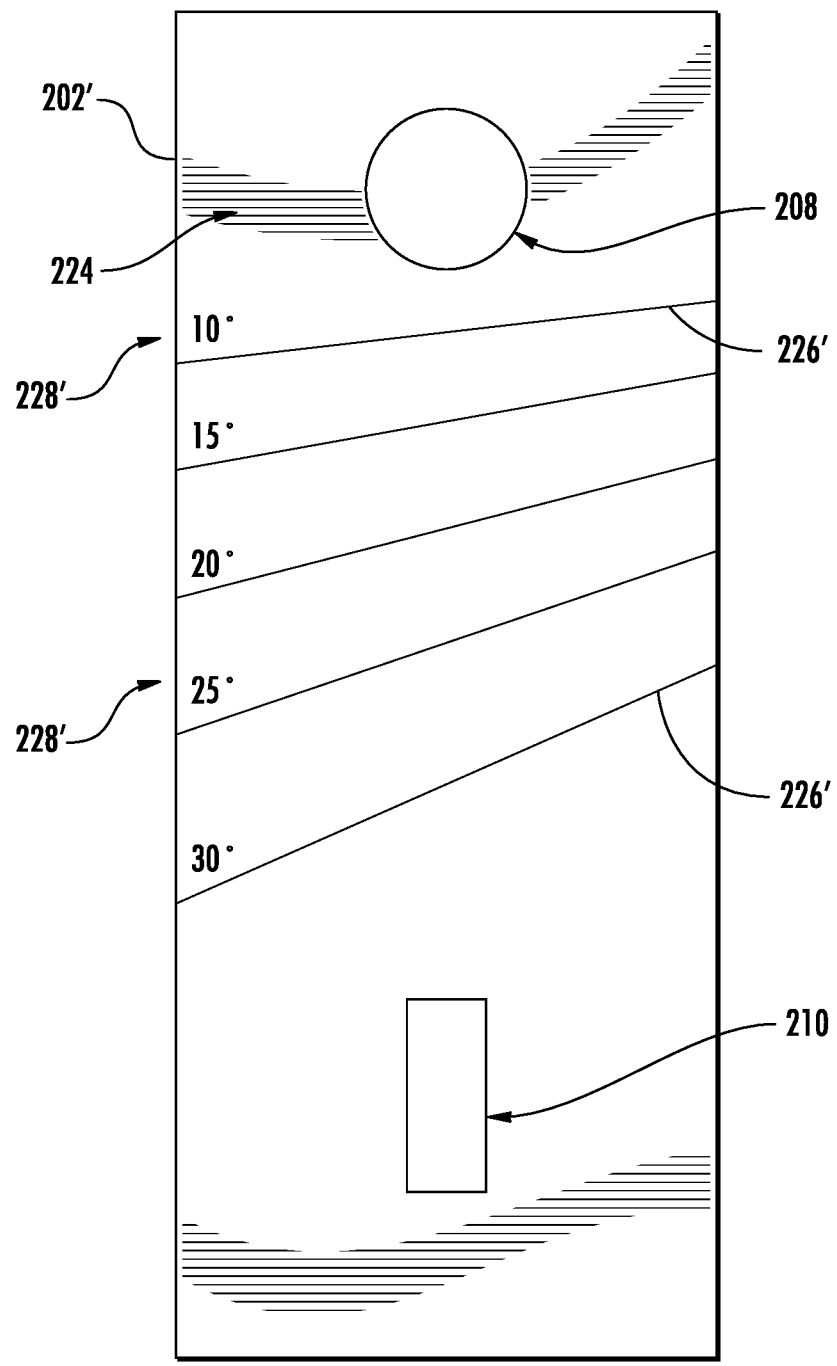
Figure 2C:
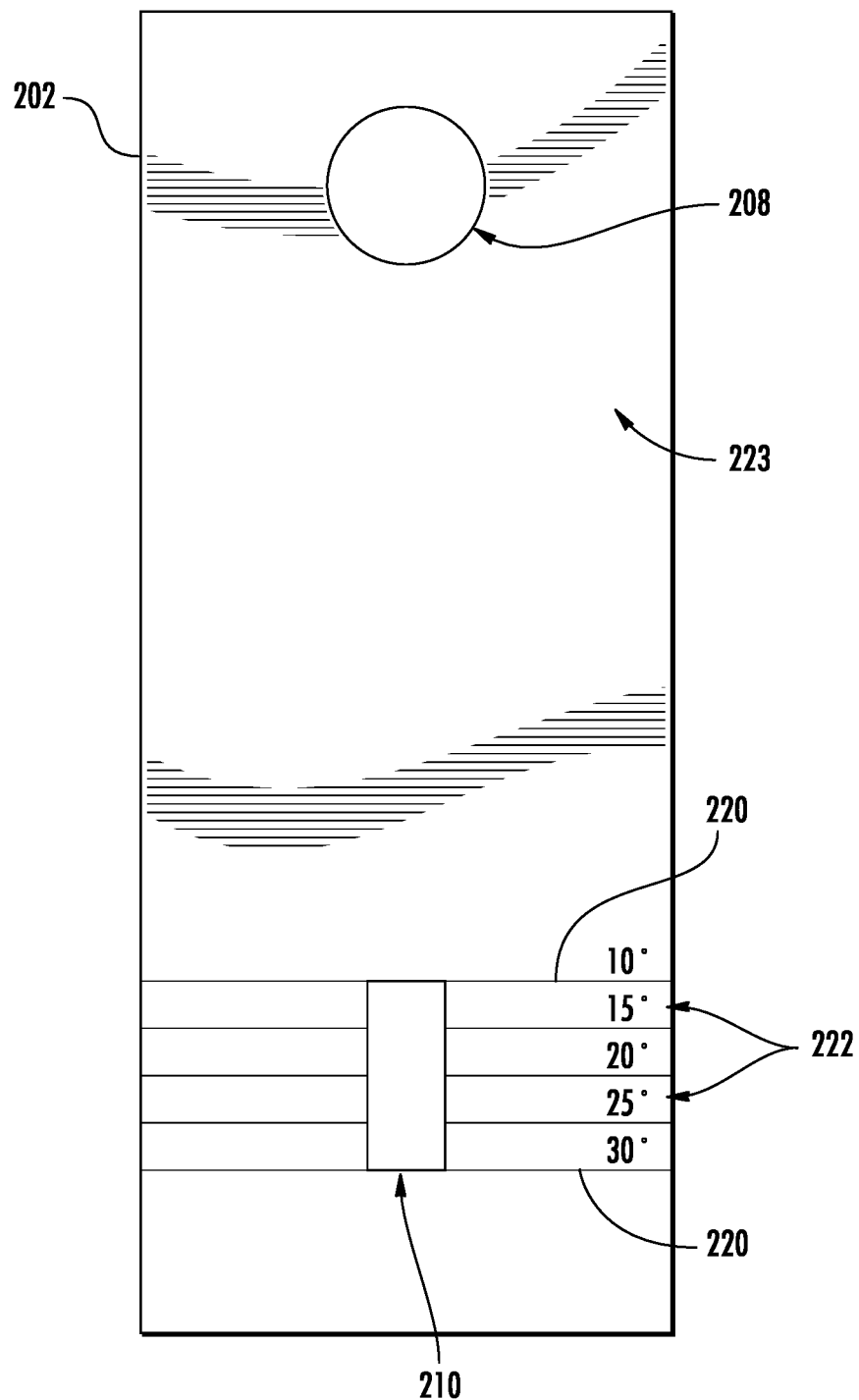
Figure 2D:
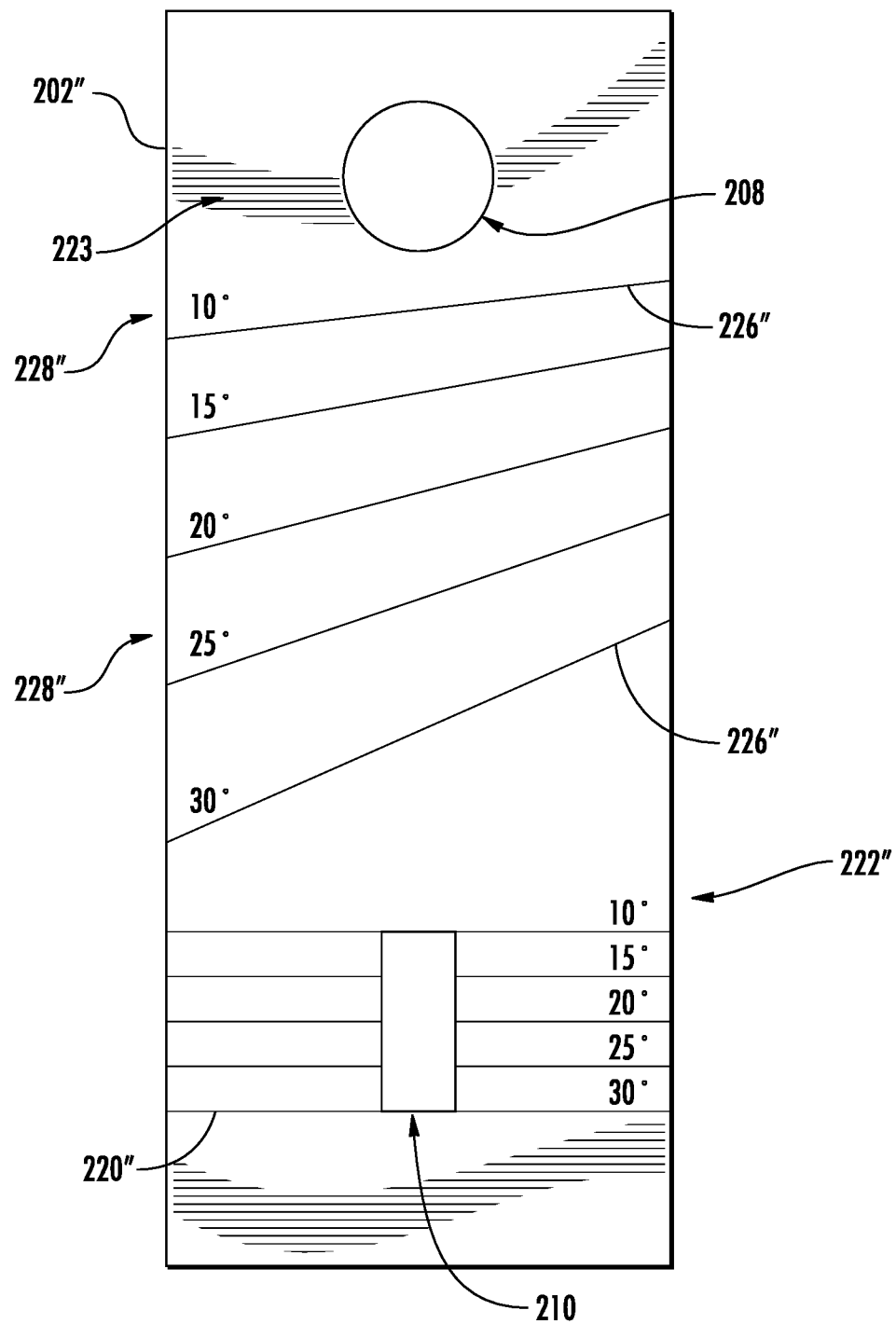
Figure 3A:
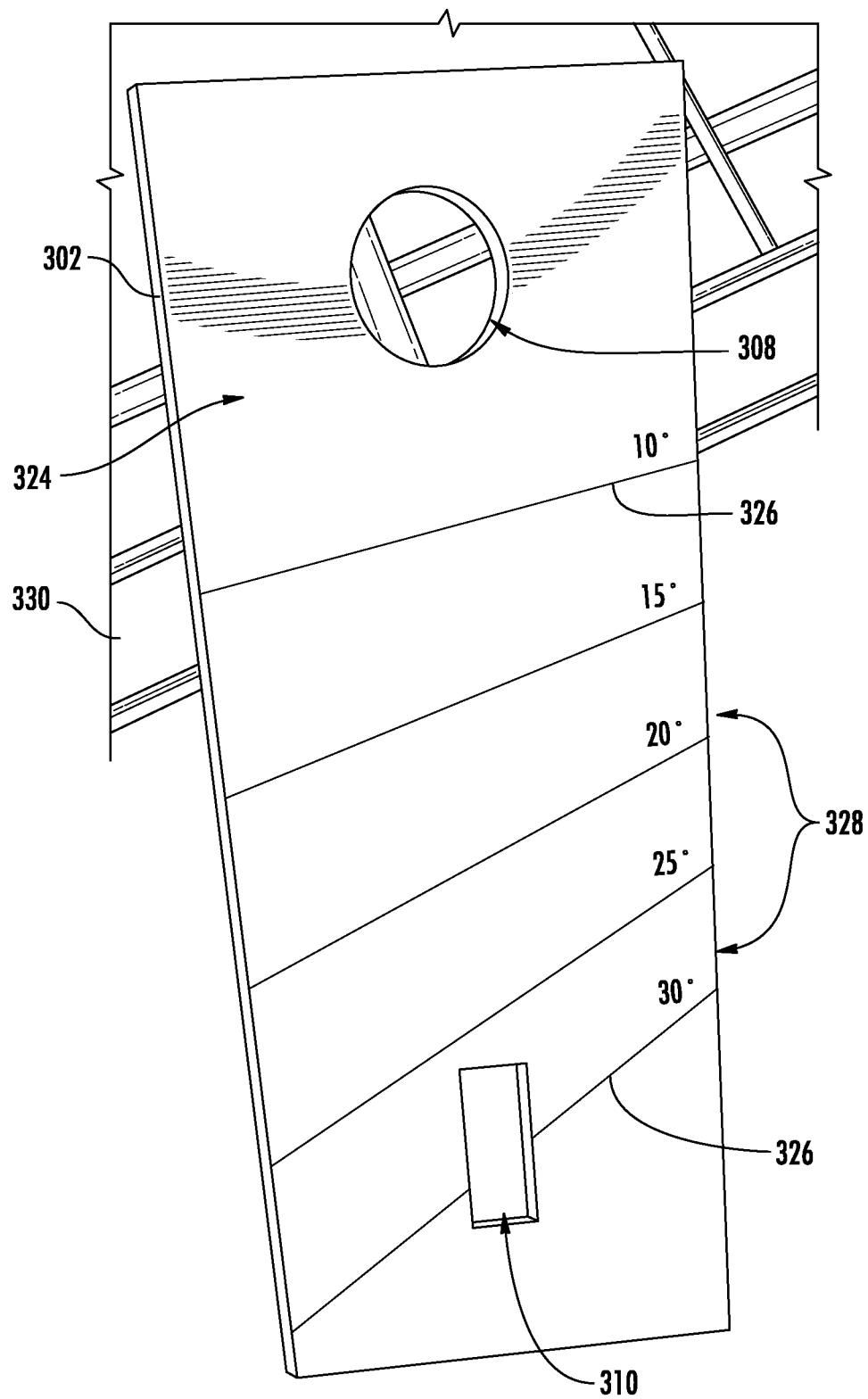
Figure 3B:
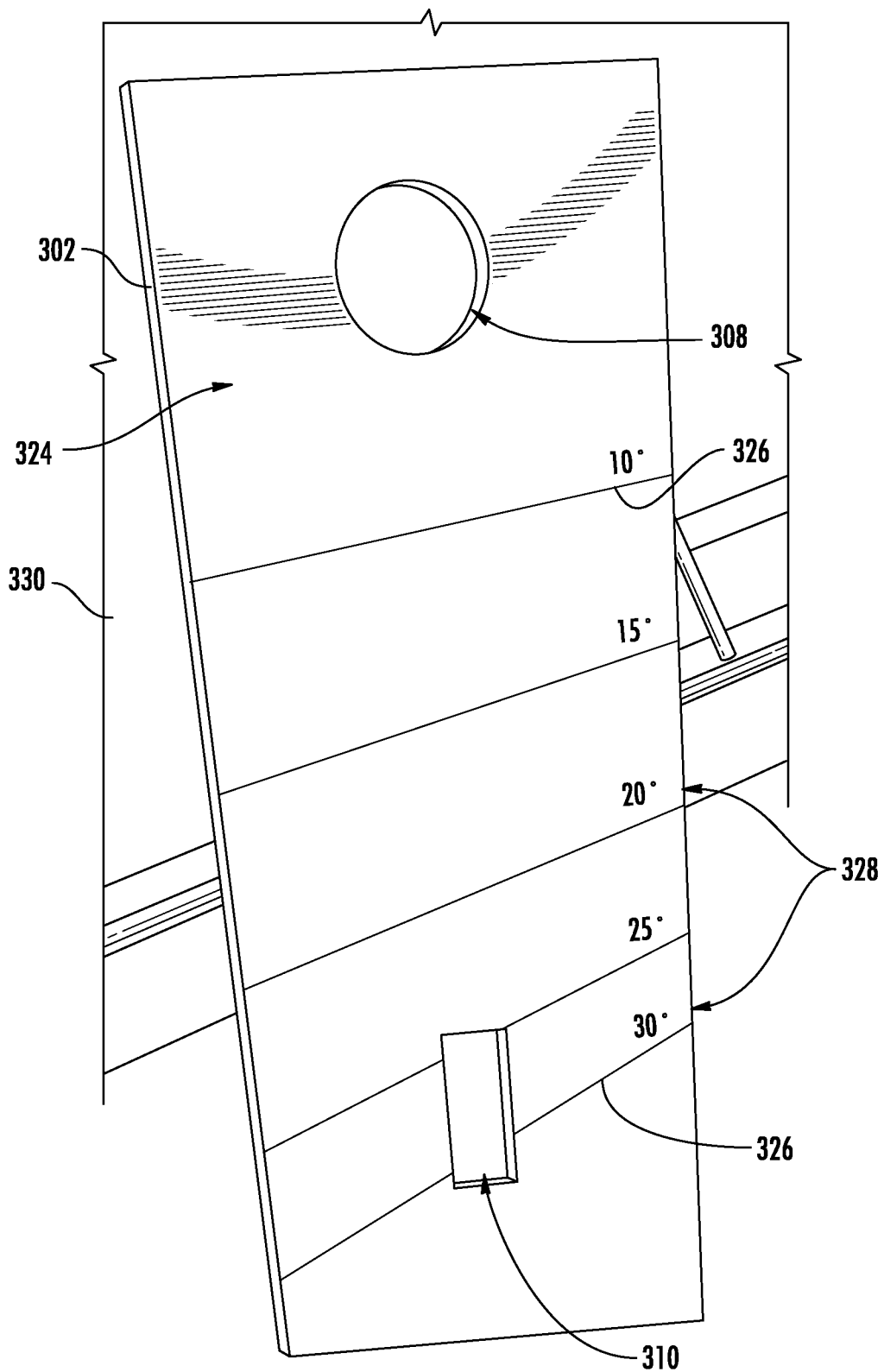
Figure 4A:
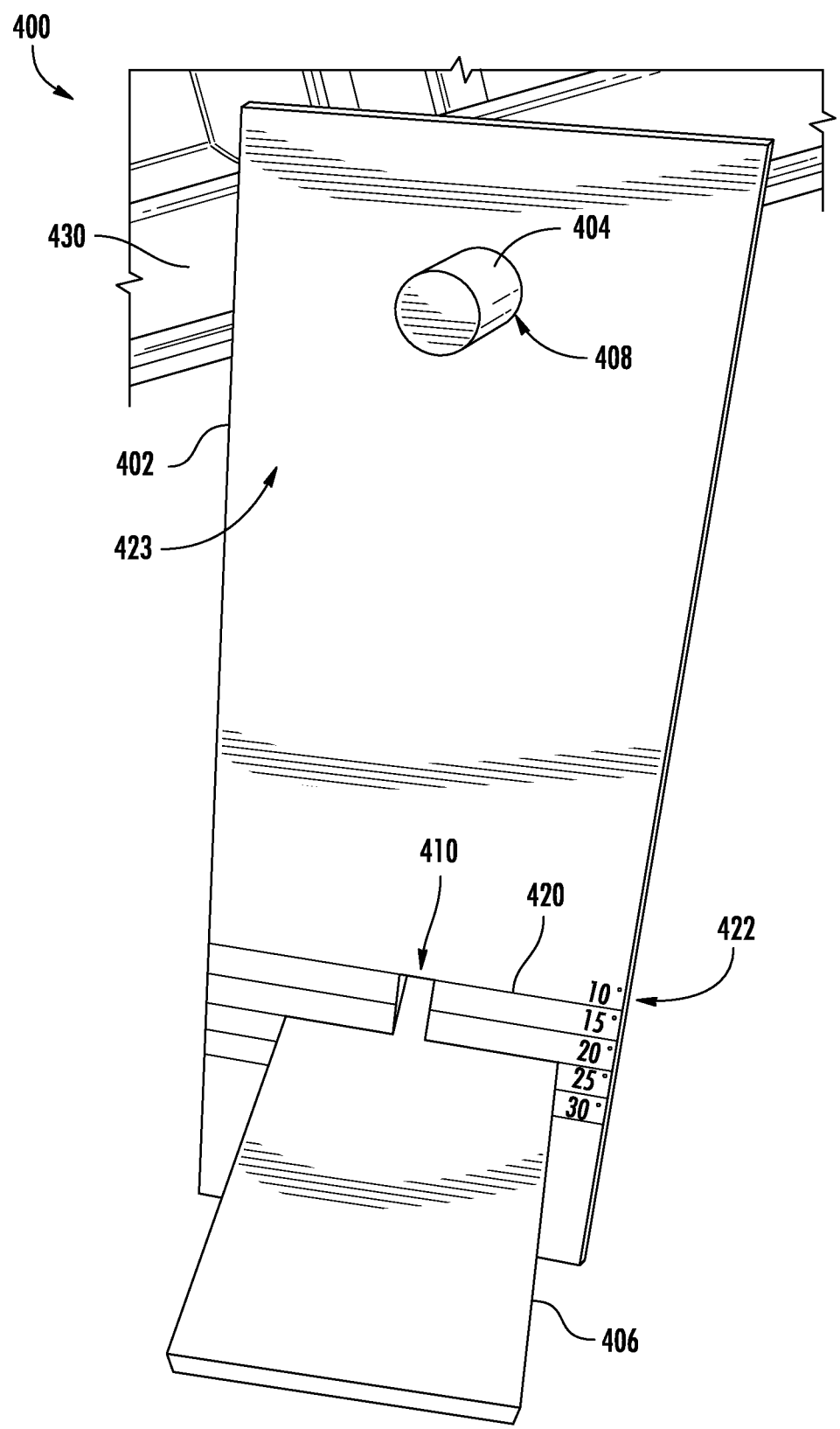
Figure 4B:
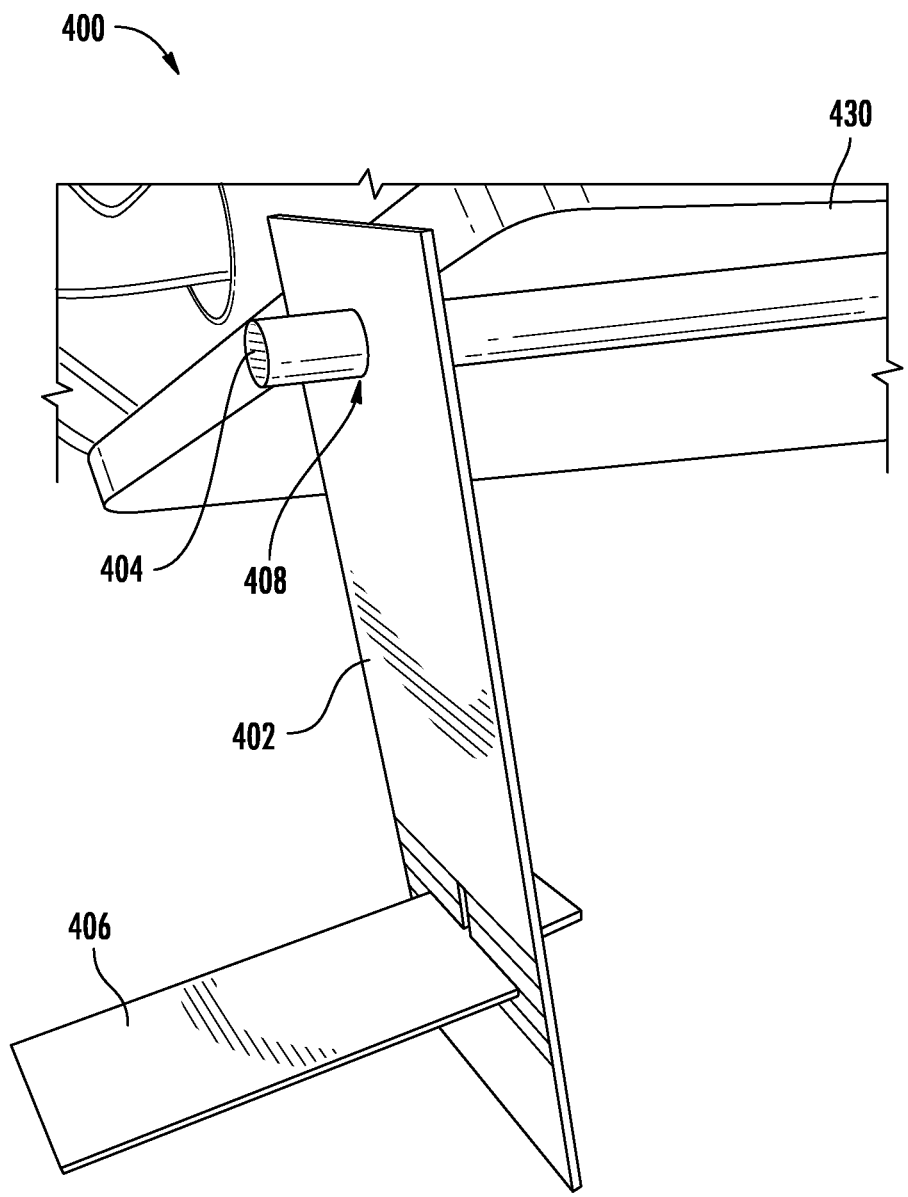
Figure 4C:
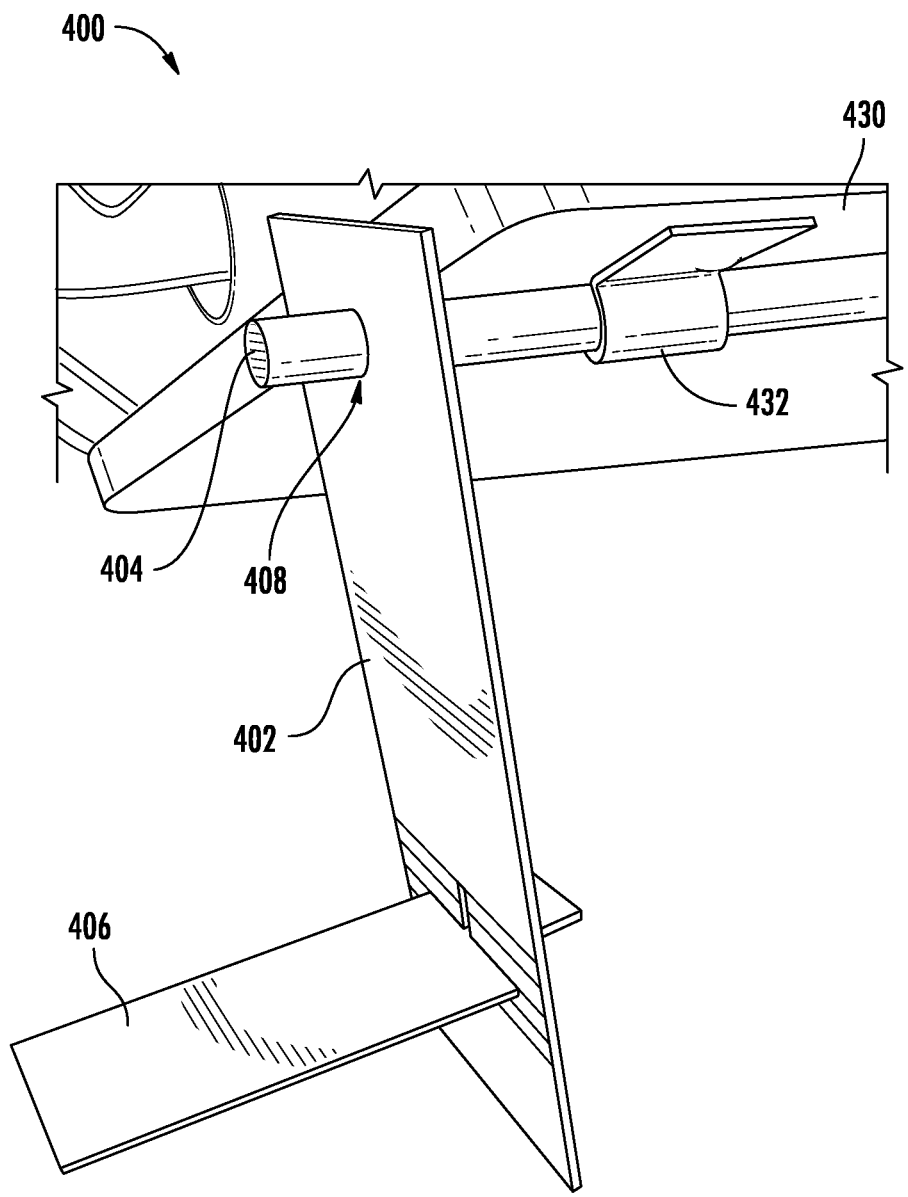
Figure 4D:
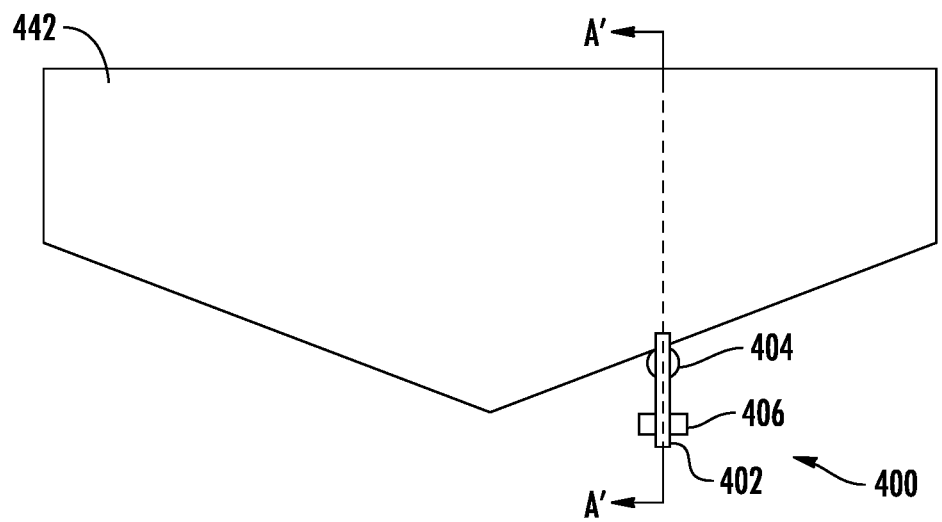
Figure 4E:
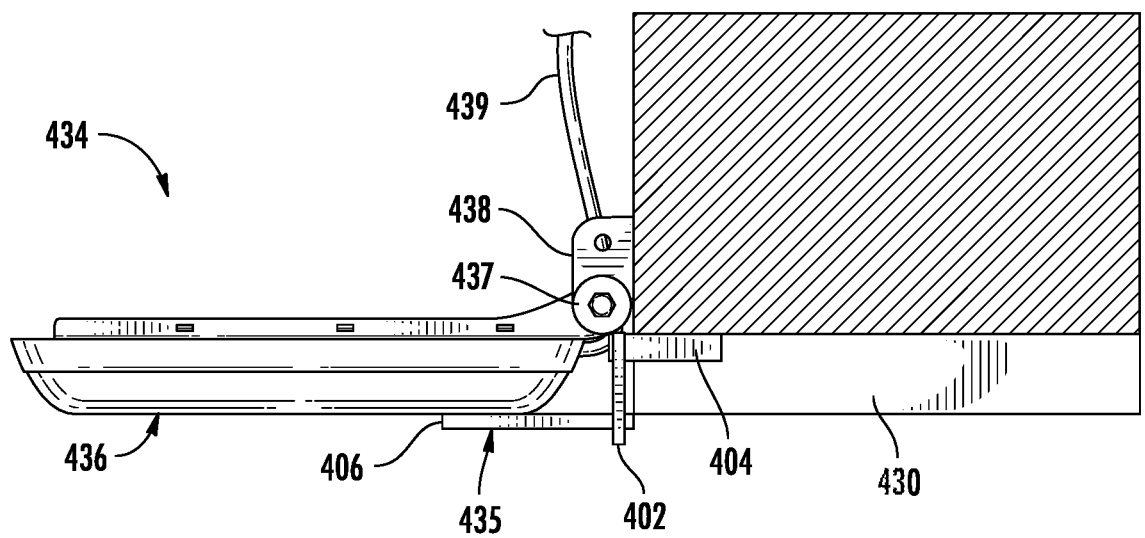
Figure 5:
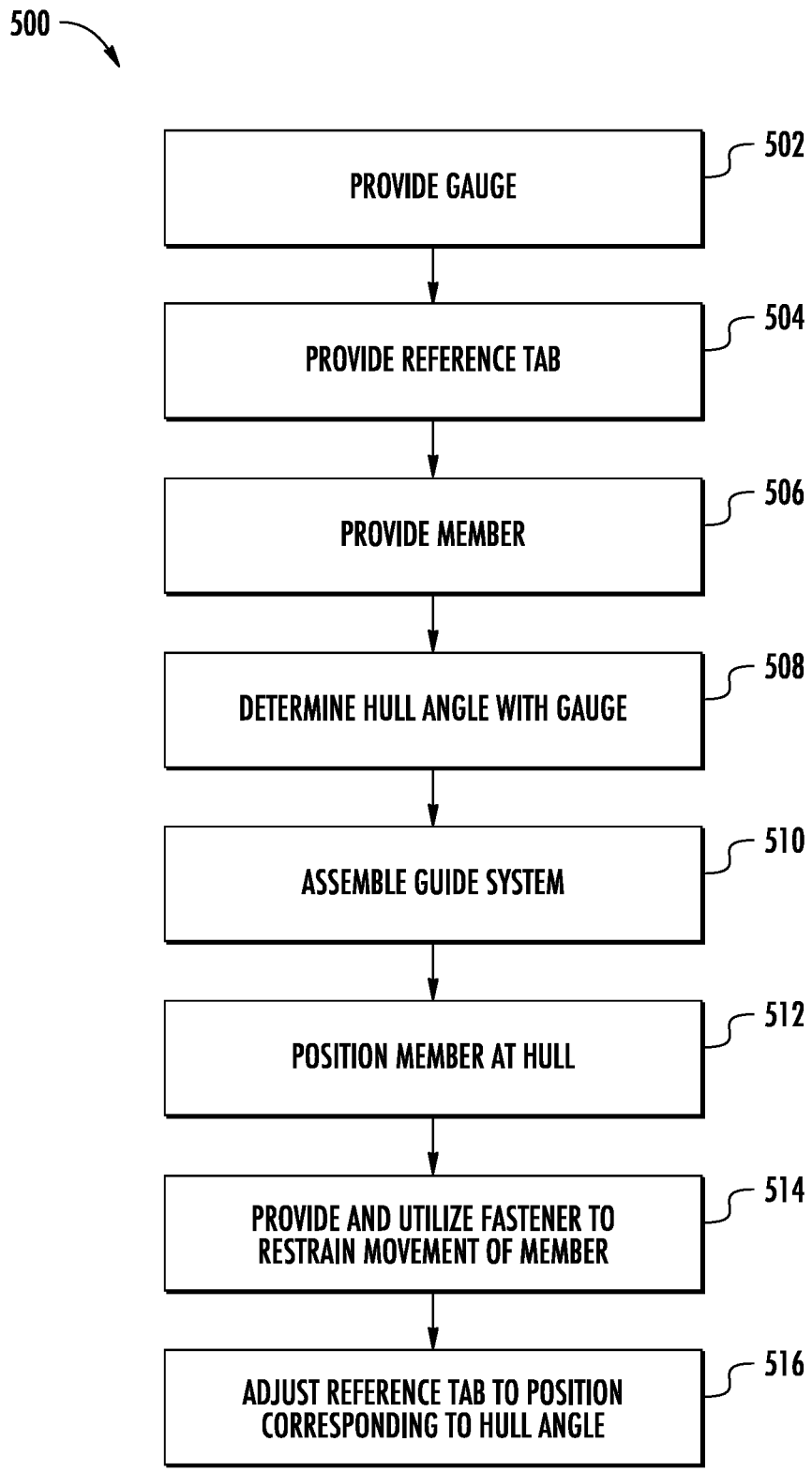

Having thus described the invention in general terms, reference will now be made to the accompanying drawings, which are not necessarily drawn to scale, and wherein:

FIG. 1A illustrates a perspective view of an example guide system, in accordance with some embodiments discussed herein;

FIG. 1B illustrates another perspective view the example guide system of FIG. 1A, in accordance with some embodiments discussed herein;

FIG. 1C illustrates various components that may be used to form the example guide system of FIG. 1A, in accordance with some embodiments discussed herein;

FIG. 2A illustrates a second side of an example gauge that may be used in a guide system, in accordance with some embodiments discussed herein;

FIG. 2B illustrates a second side of an alternative example gauge that may be used in a guide system, in accordance with some embodiments discussed herein;

FIG. 2C illustrates a first side of the example gauge of FIG. 2A, in accordance with some embodiments discussed herein;

FIG. 2D illustrates a first side of another alternative example gauge that may be used in a guide system, in accordance with some embodiments discussed herein;

FIGS. 3A and 3B illustrate views of a second side of an example gauge being used to approximate the hull angle of a watercraft, in accordance with some embodiments discussed herein;

FIG. 4A illustrates a view of an example guide system being used to indicate a correct sonar transducer assembly or housing position where the first side of the gauge may be seen, in accordance with some embodiments discussed herein;

FIG. 4B illustrates a perspective view of the example guide system of FIG. 4A being used to indicate a correct sonar transducer assembly or housing position where the first side of the gauge may be seen, in accordance with some embodiments discussed herein;

FIG. 4C illustrates a perspective view of the example guide system of FIG. 4A where a fastener is used to assist in positioning the guide system, in accordance with some embodiments discussed herein;

FIG. 4D illustrates a schematic view of a watercraft and an example guide system where the example guide system is placed at an anticipated mounting position, in accordance with some embodiments discussed herein;

FIG. 4E illustrates a schematic, cross-sectional view of a watercraft, a sonar transducer assembly, and an example guide system where the sonar transducer assembly is aligned with the reference tab, in accordance with some embodiments discussed herein; and FIG. 5 illustrates a flow chart showing a method for using the guide system, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Like reference numerals refer to like elements throughout. Additionally, any connections or attachments may be direct or indirect connections or attachments unless specifically noted otherwise.

Various example guide systems for use in mounting of a sonar transducer assembly or housing are provided herein. FIGS. 1A and 1B illustrate different perspective views of an example guide system, and FIG. 1C illustrates various components that may be used to form the example guide system of FIG. 1A where the components are not assembled together.

Looking first at FIG. 1A, the illustrated guide system 100 comprises a gauge 102 and a reference tab 106. The gauge 102 has horizontal lines 120 marked on the gauge 102, and the horizontal lines 120 indicate appropriate tab positions corresponding to various hull angles of a watercraft. Hull angle values 122 associated with the horizontal lines 120 are provided on the gauge 102 adjacent to the associated horizontal line 120. The guide system 100 also includes a reference tab 106. The reference tab 106 is configured to be positioned on the gauge 102 at an appropriate tab position corresponding to an estimated hull angle to indicate a correct sonar transducer assembly or housing position. In some embodiments, the sonar transducer assembly or housing may be installed so that the bottom of the sonar transducer assembly or housing may be aligned with the appropriate tab position and/or the reference tab 106 located at the appropriate tab position.

As illustrated in the embodiment of FIG. 1A, a member 104 may also be provided in the guide system 100. The gauge 102 may define a first recess 108 proximate to the top end of the gauge 102, and the first recess 108 may be configured to receive the member 104. As illustrated in FIGS. 4A and 4B, a member 404 may be configured to be positioned adjacent to the hull 430 or transom of the watercraft at an anticipated mounting position to provide a reference location for the sonar transducer assembly or housing. This anticipated mounting position may be a position corresponding to the position where a sonar transducer assembly or housing will be mounted to provide a reference location for the sonar transducer assembly or housing. However, in some embodiments, the guide system 100 may be provided without a member 104, or the member 104 may be attached to other components of the guide system 100 in another manner.

In the illustrated embodiment, the gauge 102 defines a second recess 110 proximate to the bottom end. This second recess 110 may be configured to receive a portion of the reference tab 106. The second recess 110 may be a narrow slit in some embodiments. The second recess 110 may be configured to permit the reference tab 106 to slide up and down upon the application of force by the user to position the reference tab 106 at the appropriate tab position. In some embodiments, the second recess 110 may be configured to permit the reference tab 106 to slide up and down upon the application of force by the user so that the top of the reference tab 106 may be positioned at the appropriate tab position. However, the bottom, middle, or some other part of the reference tab 106 may be positioned at the appropriate tab position in some embodiments. When no additional force is applied by a user to the reference tab 106 or to the gauge 102, friction between the reference tab 106 and the gauge 102 may prevent movement of the reference tab 106 relative to the gauge 102. Ultimately, the correct sonar transducer assembly or housing position may be the position where the bottom of the sonar transducer assembly or housing aligns with the appropriate tab position and/or the bottom of the reference tab 106.

Looking now at FIG. 1B, other features of the guide system 100 may be seen. As illustrated, the gauge 102 may include sloped lines 126 and hull angle values 128 associated with the sloped lines 126. Furthermore, an insert portion 114 of the reference tab 106 is also visible in FIG. 1B, but this insert portion 114 may be more readily understood in reference to FIG. 1C.

The gauge 102 may be provided with only the horizontal lines 120 in some embodiments, and the sloped lines 126 may be provided on another gauge. Alternatively, the horizontal lines 120 and the sloped lines 126 may be provided on opposite sides of the same gauge in some embodiments. For example, for the guide system 100 illustrated in FIGS. 1A-1B, the gauge 102 may have a first side 123 and a second side 124 (see FIG. 1B). In the illustrated embodiment, the horizontal lines 120 are marked on the first side 123, and the sloped lines 126 are marked on the second side 124. However, in some embodiments, the horizontal lines 120 and sloped lines 126 may both be provided on the first side 123 of the gauge 102, and an example of this is illustrated in FIG. 2D.

Looking now at FIG. 1C, various components of the guide system 100 are disassembled from each other so that certain components may be more readily understood. In FIG. 1C, details of the reference tab 106 may be more easily seen. The reference tab 106 may include a main portion 112, an insert portion 114, and a connecting portion 116. The connecting portion 116 may extend between the main portion 112 and the insert portion 114 to connect the main portion 112 and the insert portion 114. The insert portion 114 may be configured to be received in the second recess 110 of the gauge 102 so that the insert portion 114 is positioned at a second side 124 (see FIG. 1B) of the gauge 102. This may be done by rotating the reference tab 106 so that the insert portion 114 fits in the second recess 110. Once the insert portion 114 has been received through the second recess 110, the reference tab 106 may be rotated 90 degrees. By doing so, the connecting portion 116 may remain in the second recess 110. Additionally, the main portion 112 may be positioned at a first side 123 of the gauge 102 (see FIG. 1A), and the insert portion 114 may be positioned on the second side 124 (see FIG. 1B) of the gauge 102. Furthermore, after rotating the reference tab 106, friction between the reference tab 106 and the gauge 102 may assist in restraining the movement of the insert portion 114 and the reference tab 106 as a whole relative to the gauge 102. While the reference tab 106 is attached to the gauge 102 using the second recess 110 in the illustrated embodiment, the reference tab 106 may be attached in other ways as well. Further, in some embodiments, the reference tab 106 may be locked in position once the reference tab 106 is placed at the appropriate tab position using a fastener such as a clamp, an adhesive, a magnetic device, etc.

A wide variety of materials may be used for the gauge 102, the member 104, and the reference tab 106. For example, some or all of these components may include a metallic material, a plastic material, wood, cardboard, or some other material.

A gauge may be provided with sloped lines, and this gauge may be used to approximate an estimated hull angle of a watercraft, and FIG. 2A provides an example of a gauge having such a feature. FIG. 2A illustrates a second side 224 of an example gauge 202 that may be used in a guide system 100 (see FIG. 1A). As illustrated, a first recess 208 may be provided proximate to the top end of the gauge 202, and a second recess 210 may be provided proximate to the bottom end of the gauge 202. As noted previously, the first recess 208 may be used to receive a member 104 (see FIG. 1C), and the second recess 210 may be used to receive a reference tab 106 (see FIG. 1C).

In the illustrated embodiment, sloped lines 226 are marked on the second side 224 of the gauge 202. Furthermore, hull angle values 228 associated with sloped lines 226 are also marked adjacent to the sloped lines 226. The sloped lines 226 may extend at different slopes, and the sloped lines 226 may be used to provide the estimated hull angle of the watercraft. This may be done by holding the gauge in a level position and aligning the hull of the watercraft with a sloped line 226 on the gauge 202. An example of such alignment is illustrated in FIGS. 3A-3B. If the actual hull angle falls between two of the sloped lines and does not exactly match the angle of one of the sloped lines, a user may approximate the hull angle using the sloped lines and use that approximated value as the estimated hull angle going forward. For example, if the actual hull angle is 17.5 degrees and the sloped lines 226 jump from a 15 degree line and a 20 degree line, then the user may approximate the 17.5 degree angle and use that approximated value as the estimated hull angle going forward.

While five angled lines 226 are illustrated in FIG. 2A, additional angled lines may be provided to enable more precise estimations of the hull angle. In some embodiments, major and minor angled lines may be provided, with major lines having an associated hull angle value 228 marked and with minor lines not having any associated hull angle value marked on the gauge. Such an approach may be beneficial to provide several markings in a small area on the gauge 202.

Markings may be provided on the gauge 202 in several different ways. For example, the markings may be provided in a different color than the surrounding surfaces, the markings may be provided as a sticker, or the markings may be provided as an indentation on the gauge 202. However, the markings may be provided in other ways as well.

The sloped lines 226 are marked on the second side 224 of the gauge 202 in the illustrated embodiment in FIG. 2A. However, in some embodiments, the sloped lines 226 may be marked on a second gauge that is separate from the gauge 202.

The sloped lines 226 may be positioned at any location on the gauge 202. For example, in the embodiment illustrated in FIG. 2A, the sloped lines 226 are intersected by the second recess 210. However, FIG. 2B illustrates an alternative gauge 202' where the sloped lines 226' and hull angle values 228' associated with sloped lines 226' are positioned at another location. In the gauge 202', the sloped lines 226' are provided between the first recess 208 and the second recess 210. Providing the sloped lines 226' at this position may be beneficial so that neither the first recess 208 nor the second recess 210 intersect or otherwise interfere with the sloped lines 226'. This may permit the easy use of the sloped lines 226' to approximate the hull angle even when a reference tab 106 and/or member 104 are assembled to the gauge 202'. Thus, with the embodiment illustrated in FIG. 2B, the gauge 202' may remain assembled with other components to form a guide system, and disassembly would not be necessary to estimate the hull angle.

A gauge may be provided with horizontal lines that may be used to position a reference tab at the appropriate position based on the estimated hull angle of a watercraft, and FIG. 2C provides an illustration of one example of such a gauge. FIG. 2C illustrates a first side 223 of the example gauge 202 of FIG. 2A. The first side 223 may include horizontal lines 220. Hull angle values 222 (e.g. 10 deg., 15 deg., 20 deg., etc.) may also be provided on the gauge 202 adjacent to an associated horizontal line 220, and the hull angle values 222 may indicate a hull angle that the associated horizontal line 220 corresponds to.

The gauge 202 may include a second recess 210 proximate to the bottom end of the gauge 202, and the horizontal lines 220 may be marked proximate to the second recess 210. In this way, a reference tab 106 (see FIG. 1A) may be shifted up and down within the second recess 210 so that the bottom of the reference tab 106 (or, in some cases, the top or middle of the reference tab 106) may be positioned at the appropriate tab position using the horizontal lines 220 and hull angle values 222 as a reference.

While five horizontal lines 220 are illustrated in FIG. 2C, additional horizontal lines may be provided to enable more precise estimations of the hull angle. In some embodiments, major and minor horizontal lines may be provided, with major lines having an associated hull angle value 222 marked and with minor lines not having an associated hull angle value 222. Such an approach may be beneficial to provide several markings in a small area on the gauge 202. In some embodiments, minor horizontal lines may be provided adjacent to a first edge of the gauge 202 (e.g. the left edge of the gauge 202), and associated hull angle values 222 associated with the major lines 220 may be provided on the opposite edge of the gauge 202 (e.g. the right edge of the gauge 202).

FIG. 2D illustrates a first side 223 of another alternative example gauge 202" that may be used in a guide system. As noted above, horizontal lines and sloped lines may be marked on the same side of a gauge in some embodiments, and FIG. 2D illustrates an example of this. As illustrated, the first side 223 of the gauge 202" includes both horizontal lines 220" and associated hull angle values 222" for the horizontal lines 220". Additionally, the first side 223 of the gauge 202" includes sloped lines 226" and associated hull angle values 228". The horizontal lines 220" may be provided proximate to the second recess 210, and the sloped lines 226" may be provided between the first recess 208 and the second recess 210.

In some embodiments, the guide system may solely include a gauge such as the gauges 202, 202', 202" illustrated in FIGS. 2A-2D. If this is the case, the user may manually hold the gauge upright when determining the estimated hull angle. Further, where the guide system only includes the gauge, the user may install the sonar transducer assembly or housing so that the bottom surface of the sonar transducer assembly or housing matches or aligns with the appropriate tab position, and the horizontal lines 220, 220" may be used as a reference in this installation.

A gauge having sloped lines may be used to approximate the hull angle of a watercraft. FIGS. 3A and 3B illustrate views of a second side 324 of an example gauge 302 being used to approximate the hull angle of a watercraft. Similar to the embodiments described above, the gauge 302 may include a first recess 308 and a second recess 310. Further, the sloped lines 326 may be provided on a second side 324 of the gauge 302, and hull angle values 328 associated with the sloped lines 326 may be positioned adjacent to the associated sloped line 326. The sloped lines 326 may extend at different slopes, and the sloped lines 326 may be used as a reference to determine the estimated hull angle of the watercraft.

In FIGS. 3A and 3B, a hull 330 of a watercraft is also illustrated. Looking first at FIG. 3A, the gauge 302 is positioned adjacent to the hull 330 so that the sloped line associated with a 10 degree angle is proximate to the bottom of the hull 330. A user may be able to tell visually that the sloped line 326 does not match the hull angle, and the user may position another sloped line 326 having a greater angle proximate to the bottom of the hull 330. Looking now at FIG. 3B, the gauge 302 may be positioned adjacent to the hull 330 so that the sloped line associated with a 20 degree angle is proximate to the bottom of the hull 330. A user may be able to tell visually that the sloped line 326 associated with a 20 degree angle matches the hull angle, and the user may use the 20 degree angle as the estimated hull angle going forward. This estimated hull angle may be used to correctly position the reference tab 106 (see FIGS. 1A-1C) at an appropriate position. The hull angle may be determined at a position corresponding to the anticipated mounting position.

If the actual hull angle falls between two of the sloped lines 326 and does not exactly match the angle of one of the sloped lines 326, a user may approximate the estimated hull angle using the sloped lines 326 and use that approximated value as the estimated hull angle going forward. For example, if the actual hull angle is 17.5 degrees and the sloped lines jump from a 15 degree line and a 20 degree line, then the user may use the sloped lines as a reference to approximate the 17.5 degree angle and use that approximated value as the estimated hull angle going forward.

The gauge 302 should be held in an upright position when being used to approximate the hull angle. For example, the top edge and bottom edge of the gauge 302 should extend horizontally when the gauge 302 is being used to approximate the hull angle. The upright position may help ensure the accuracy of any estimated hull angle that is determined.

The gauge 302 may be held in an upright position manually by a user in some embodiments. In other embodiments, a member 104 (see FIGS. 1A-1C) may be inserted in the first recess 308, and the member 104 may take the form of a cylindrical rod (although other shapes are contemplated). Once the member is received in the first recess 308, a user simply may hold the member 104 to cause the gauge 302 to self-level as a result of gravitational force.

The guide system may be provided adjacent to a hull or a transom of a watercraft in some embodiments, and the reference tab may be adjusted to indicate a correct sonar transducer assembly or housing position. FIGS. 4A and 4B illustrate various views of an example guide system being used to indicate a correct sonar transducer assembly or housing position. As illustrated in FIGS. 4A and 4B, a gauge 402, a member 404, and a reference tab 406 may be provided. A first recess 408 may be provided proximate to the top end of the gauge 402, and this first recess 408 may receive the member 404 therein.

In some embodiments, the member 404 may be a cylindrical rod. Additionally, in some embodiments, the first recess 408 may be sized so that the gauge 402 may rotate relative to the member 404 when the member 404 is received in the first recess 408. By sizing the first recess 408 in this manner, the user may simply hold the member 404 and the gauge 402 will rotate and self-level due to the gravitational force. However, in other embodiments, the first recess 408 may be sized so that the gauge 402 may not rotate relative to the member 404 when the member 404 is received in the first recess 408, and the gauge 402 will still tend to rotate and self-level due to the gravitational force.

As illustrated in FIG. 4B, the member 404 may be configured to be positioned adjacent to the hull 430 of the watercraft at an anticipated mounting position which may be a position corresponding to the position where a sonar transducer assembly or housing will be mounted to the hull 430. By doing so, the guide system 400 may provide a reference location for the sonar transducer assembly or housing to enable the sonar transducer assembly or housing to be installed at the optimal position.

In the illustrated embodiment in FIG. 4B, the member 404 is positioned adjacent to the transom of the watercraft, and the member 404 may be provided at a position corresponding to the position where a sonar transducer assembly or housing will be mounted to the transom. However, the member 404 may be provided at other locations adjacent to the hull 430 of the watercraft where a sonar transducer assembly or housing may be assembled as well.

Looking back at FIG. 4A, the reference tab 406 may be received in the second recess 410, and the reference tab 406 may be slid up or down to the appropriate tab position corresponding to the estimated hull angle. This may be done by referencing the horizontal lines 420 presented on the first side 423 of the gauge 402 as well as the hull angle values 422 associated with the horizontal lines 420. The reference tab 406 may be positioned so that the bottom surface of the reference tab 406 is positioned at the appropriate tab position in some embodiments. The correct sonar transducer assembly or housing position may be the position where the bottom of the sonar transducer assembly or housing should be located, so the bottom of the sonar transducer assembly or housing may be installed so that it matches or aligns with the bottom of the reference tab 406.

Looking now at FIG. 4C, another perspective view is provided illustrating an example guide system. In this example guide system, a fastener 432 is provided. The fastener 432 may be configured to restrain the movement of the member 404 relative to the watercraft. Various fasteners 432 may be used, including but not limited to a clamp, an adhesive (e.g., glue, tape, etc.), a magnetic device, Velcro, etc.

In FIG. 4D, a schematic view is illustrated of a watercraft 442 and an example guide system where the example guide system 400 is placed at an anticipated mounting position. The guide system 400 includes a gauge 402, a member 404, and a reference tab 406.

Turning to FIG. 4E, a cross-sectional schematic view is illustrated of a sonar transducer assembly 434 and an example guide system. As illustrated in FIG. 4E, a cross-section of the watercraft is shown about the line A'-A' of FIG. 4D. A cable 439 may be provided in the sonar transducer assembly 434, and the cable 439 may be used to provide power to the sonar transducer assembly 434 and/or to allow communication between the sonar transducer assembly 434 and other components on a watercraft. The sonar transducer assembly 434 may also include a bolt 437 and a mounting bracket 438. The bolt 437 may be used to connect the mounting bracket 438 to the remainder of the sonar transducer assembly 434. The mounting bracket 438 may be used to attach the sonar transducer assembly 434 to the watercraft at the hull or the transom of the watercraft.

With reference to FIG. 4E, the bottom surface 436 of the sonar transducer assembly 434 is aligned with the top surface of the reference tab 406. In some embodiments, the bottom surface 436 of the sonar transducer assembly 434 may be aligned with the top surface of the reference tab 406 so that the sonar transducer assembly 434 may be installed at the appropriate mounting position, and this may be accomplished by resting the sonar transducer assembly 434 on top of the reference tab 406. However, in other embodiments, the bottom surface 436 of the sonar transducer assembly 434 may be aligned with the bottom surface 435 of the reference tab 406 or some other portion of the reference tab 406 so that the sonar transducer assembly 434 may be installed at the appropriate mounting position.

While FIG. 4E illustrates a guide system 400 being utilized with a sonar transducer assembly 434, the guide system 400 may be utilized with a sonar housing in some embodiments. In some embodiments, multiple sonar transducer arrays may be provided in a sonar housing with the sonar transducer arrays oriented differently, and this may be done to increase the overall coverage area for the sonar transducer arrays in the sonar housing. For some of these embodiments, the guide system may be used to position the sonar housing.

In some embodiments, the member 404 of the guide system may be held at approximately the same level as the bolt 437 of the sonar transducer assembly 434. By doing so, the location where the sonar transducer assembly 434 will be mounted to the hull of a watercraft may correspond to the anticipated mounting position provided by the guide system. The anticipated mounting position may be the position of the reference tab in some embodiments.

In some embodiments, the guide system may assist in positioning a sonar transducer assembly or housing at the correct vertical position and correct horizontal position and with the correct orientation. For example, the guide system may be provided at the correct position by positioning the member 404 adjacent to the bottom edge of the hull of the watercraft at the anticipated mounting position. By doing so, the guide system may provide a reference location for the sonar transducer assembly or housing, and the guide system may also provide an indication of the correct orientation for the sonar transducer assembly or housing. With the guide system in this location, the guide system may provide a reference to assist the user in installing the sonar transducer assembly or housing at the correct position and at the correct orientation. For example, the bottom surface of the sonar transducer assembly or housing may be placed on the reference tab so that the sonar transducer assembly or housing rests on the top surface of the reference tab, and this may assist in maintaining proper orientation and proper vertical and horizontal positioning for the sonar transducer assembly or housing.

In some embodiments, the bottom surface of the sonar transducer assembly or housing may be aligned with the bottom surface of the reference tab, and this may also help assist in maintaining proper orientation and proper vertical and horizontal positioning for the sonar transducer assembly or housing. In other embodiments, the guide system may simply provide a reference to assist in positioning the sonar transducer assembly or housing at the correct vertical position.

Additionally, methods of making and/or using a guide system are also contemplated, and FIG. 5 illustrates a flow chart showing a method 500 for using the guide system. At operation 502, a gauge is provided. The gauge may include sloped lines marked on the gauge, and the sloped lines may extend at different slopes. The sloped lines may be configured to indicate an estimated hull angle of a watercraft (see, e.g., FIGS. 3A-3B and the corresponding discussion). The gauge may also include horizontal lines marked on the gauge, and the horizontal lines may indicate appropriate tab positions corresponding to estimated hull angles.

At operation 504, a reference tab may be provided. The reference tab may be configured to be positioned on the gauge, and the reference tab may be positioned at the appropriate tab position corresponding to the estimated hull angle to indicate a correct sonar transducer assembly or housing position. In some embodiments, the top of the reference tab may be positioned so that it is positioned at the appropriate tab position.

At operation 506, a member may be provided. This member may be a rod or a cylindrical rod in some embodiments. However, in some embodiments, the member may not be provided, and the gauge and the reference tab may be used to form a guide system.

At operation 508, an estimated hull angle of the watercraft may be determined. This may be done using the sloped lines of the gauge as a reference to determine an estimated hull angle (see, e.g., FIGS. 3A-3B and the corresponding discussion).

At operation 510, the guide system may be assembled. Where a reference tab is used, this may involve assembling the reference tab to the gauge at a second recess. Where a member is used, this may involve assembling the member to the gauge at a first recess.

At operation 512, the member of the assembled guide system may be positioned adjacent to the hull. The member may be positioned so that it abuts the hull. Where the member is a cylindrical rod, the member may simply be held by the user to permit the guide system and the gauge to self-level. The member may be positioned at the anticipated mounting position to provide a reference location for the sonar transducer assembly or housing.

At operation 514, a fastener may be provided, and the fastener may be utilized to restrain the movement of the member relative to the watercraft. By doing so, this may enable the guide system to be more easily used by a single user as the user may more easily adjust a position of the reference tab or install a sonar transducer assembly or housing at the appropriate position.

At operation 516, the reference tab may be adjusted to a position corresponding to the hull angle. This may be done using horizontal lines and associated hull angle values as a reference.

The operations discussed herein for the method 500 may be performed in any order unless otherwise noted or unless readily apparent. For example, operation 516 may be performed before operations 512 and 514 in some embodiments. Additionally, certain operations may be omitted from the method 500. For example, the method 500 may be performed in some embodiments without performing operation 506. Additionally, other operations may be added to the method 500.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A guide system for use in mounting of a sonar transducer assembly or housing, the guide system comprising:
    a gauge having a plurality of horizontal lines marked on the gauge, wherein the plurality of horizontal lines indicate appropriate tab positions corresponding to hull angles of a watercraft; and
    a reference tab, wherein the reference tab is configured to be positioned on the gauge at an appropriate tab position and extend therefrom to indicate a correct sonar transducer assembly or housing position during mounting of the sonar transducer assembly or housing, wherein the appropriate tab position corresponds to an estimated hull angle at an anticipated mounting position.

2. The guide system of claim 1, wherein a plurality of sloped lines are marked on the gauge, wherein the plurality of sloped lines extend at different slopes and are configured to provide the estimated hull angle of the watercraft when the user aligns one of the plurality of sloped lines with a bottom edge of the hull of the watercraft at the anticipated mounting position corresponding to where the sonar transducer assembly or housing will be mounted to the hull.

3. The guide system of claim 2, wherein the plurality of horizontal lines are marked on a first side of the gauge and the plurality of sloped lines are marked on a second side of the gauge.

4. The guide system of claim 2, wherein the plurality of horizontal lines are marked on the first side of the gauge and the plurality of sloped lines are marked on a first side of the gauge.

5. The guide system of claim 2, further comprising:
    a member that is configured to be assembled to the gauge, wherein the member is configured to be positioned adjacent to the bottom edge of the hull of the watercraft at the anticipated mounting position so as to provide a reference location for the sonar transducer assembly or housing.

6. The guide system of claim 5, wherein the member is configured to be positioned adjacent to the transom of the watercraft at the anticipated mounting position.

7. The guide system of claim 6, wherein the member is a cylindrical rod, wherein the member may be configured to self-level.

8. The guide system of claim 6, further comprising:
    a fastener that is configured to restrain the movement of the member relative to the watercraft.

9. The guide system of claim 2, wherein the gauge has a top end and a bottom end, wherein the gauge defines a first recess proximate to the top end, wherein the first recess is configured to receive a member that is configured to be positioned adjacent to the bottom edge of the hull of the watercraft at the anticipated mounting position to provide a reference location for the sonar transducer assembly or housing.

10. The guide system of claim 1, wherein a plurality of sloped lines are marked on a second gauge, wherein the plurality of sloped lines extend at different slopes and are configured to provide the estimated hull angle of the watercraft when the user aligns one of the plurality of sloped lines with a bottom edge of the hull of the watercraft at the anticipated mounting position.

11. The guide system of claim 1, wherein the gauge has a top end and a bottom end, wherein the gauge defines a second recess proximate to the bottom end, wherein the second recess is configured to receive a portion of the reference tab, wherein the second recess is configured to permit the reference tab to slide up and down to position the reference tab at the appropriate tab position.

12. The guide system of claim 11, wherein the reference tab includes a main portion, an insert portion, and a connecting portion that connects the main portion and the insert portion, wherein the insert portion is configured to be received in the second recess of the gauge so that the insert portion is positioned at a second side of the gauge with its movement being restrained and the main portion is positioned at a first side of the gauge.

13. The guide system of claim 1, wherein the gauge has a top end and a bottom end, wherein the gauge defines a first recess proximate to the top end, wherein the gauge defines a second recess proximate to the bottom end, wherein the plurality of sloped lines are provided between the first recess and the second recess.

14. The guide system of claim 1, wherein the gauge has a top end and a bottom end, wherein the gauge defines a second recess proximate to the bottom end, wherein the plurality of horizontal lines are marked proximate to the second recess.

15. The guide system of claim 1, wherein the correct sonar transducer assembly or housing position is the position where the bottom of the sonar transducer assembly or housing should be located.

16. The guide system of claim 1, wherein the correct sonar transducer assembly or housing position provides a correct orientation, a correct horizontal position, and a correct vertical position for the sonar transducer assembly or housing.

17. A gauge for use in mounting of a sonar transducer assembly or housing, the gauge comprising:
- a first side with a plurality of horizontal lines marked on the first side of the gauge, wherein the plurality of horizontal lines indicate appropriate mounting positions for a sonar transducer assembly or housing corresponding to hull angles of a watercraft; and
- a plurality of sloped lines marked on the first side of the gauge or a second side of the gauge, wherein the plurality of sloped lines extend at different slopes and are configured to provide an estimated hull angle of the watercraft when the user aligns one of the plurality of sloped lines with a bottom edge of the hull of the watercraft at an anticipated mounting position, wherein the anticipated mounting position is a position corresponding to the position where the sonar transducer assembly or housing will be mounted to the hull.

18. The gauge of claim 17, wherein the gauge is configured to receive a reference tab at an appropriate mounting position on the gauge corresponding to the estimated hull angle to indicate the correct sonar transducer assembly or housing position.

19. A method for using a guide system, the method comprising:
providing a gauge having:
- a plurality of sloped lines marked on the gauge, wherein the plurality of sloped lines extend at different slopes, wherein the plurality of sloped lines are configured to indicate an estimated hull angle of a watercraft;
- a plurality of horizontal lines marked on the gauge, wherein the plurality of horizontal lines indicate appropriate tab positions corresponding to hull angles of the watercraft; and providing a reference tab, wherein the reference tab is configured to be positioned on the gauge at the appropriate tab position corresponding to the estimated hull angle to indicate a correct sonar transducer assembly or housing position;

using the plurality of sloped lines to determine the estimated hull angle of the watercraft by aligning one of the plurality of sloped lines with a bottom edge of the hull of the watercraft at a position corresponding to an anticipated mounting position, where the anticipated mounting position is a position where the sonar transducer assembly or housing will be mounted to the hull;

assembling the reference tab to the gauge so that the reference tab is positioned at an appropriate tab position corresponding to the estimated hull angle; and positioning the reference tab and the gauge proximate to the hull of the watercraft.

20. The method of claim 19, further comprising:
providing a member;
assembling the member to a top end of the gauge; and
positioning the member adjacent to the hull of the watercraft at a position corresponding to the anticipated mounting position to provide a reference location for the sonar transducer assembly or housing.

* * * * *